United States Patent
Omiya

(10) Patent No.: US 6,169,859 B1
(45) Date of Patent: Jan. 2, 2001

(54) VIEWFINDER

(75) Inventor: Akio Omiya, Omiya (JP)

(73) Assignee: Fuji Photo Optical Co., Ltd., Saitama (JP)

(*) Notice: Under 35 U.S.C. 154(b), the term of this patent shall be extended for 0 days.

(21) Appl. No.: 09/237,914

(22) Filed: Jan. 27, 1999

(30) Foreign Application Priority Data

Jan. 30, 1998 (JP) .................................................. 10-019851

(51) Int. Cl.[7] ............................ G03B 13/02; G03B 13/06
(52) U.S. Cl. ........................... 396/373; 396/382; 396/386
(58) Field of Search ..................................... 396/144, 296, 396/373, 382, 385, 386; 359/414, 425, 825

(56) References Cited

U.S. PATENT DOCUMENTS

| | | | |
|---|---|---|---|
| 4,206,988 | * 6/1980 | Miyamoto et al. | 396/384 |
| 4,268,151 | * 5/1981 | Kobori et al. | 396/382 |
| 4,712,297 | * 12/1987 | Crema | 396/373 |
| 5,005,948 | * 4/1991 | Takahashi et al. | 359/819 |
| 5,289,320 | * 2/1994 | Kobayashi | 359/819 |
| 5,434,704 | * 7/1995 | Connors et al. | 359/403 |
| 5,587,754 | * 12/1996 | Katayama et al. | 396/144 |
| 5,893,650 | * 4/1999 | Ohmura | 396/51 |

FOREIGN PATENT DOCUMENTS

| | | |
|---|---|---|
| 1155325 | 6/1989 | (JP). |
| 1291227 | 11/1989 | (JP). |

* cited by examiner

*Primary Examiner*—Eddie C. Lee
(74) *Attorney, Agent, or Firm*—Birch, Stewart, Kolasch & Birch, LLP

(57) ABSTRACT

A diopter adjustment lens is provided with a follower pin on the edge thereof, and is arranged inside a cylinder provided with a guide groove engaging with the follower pin. A diopter adjustment dial, which is integrated with a diopter adjustment ring, is rotatably fitted on the cylinder. The diopter adjustment ring is provided with a cam face, and the follower pin of the diopter adjustment lens is brought into contact with the cam face through the guide groove in the cylinder. Rotating the diopter adjustment dial moves the diopter adjustment lens forward and backward thereby adjusting the diopter of the finder unit.

16 Claims, 6 Drawing Sheets

F I G. 1
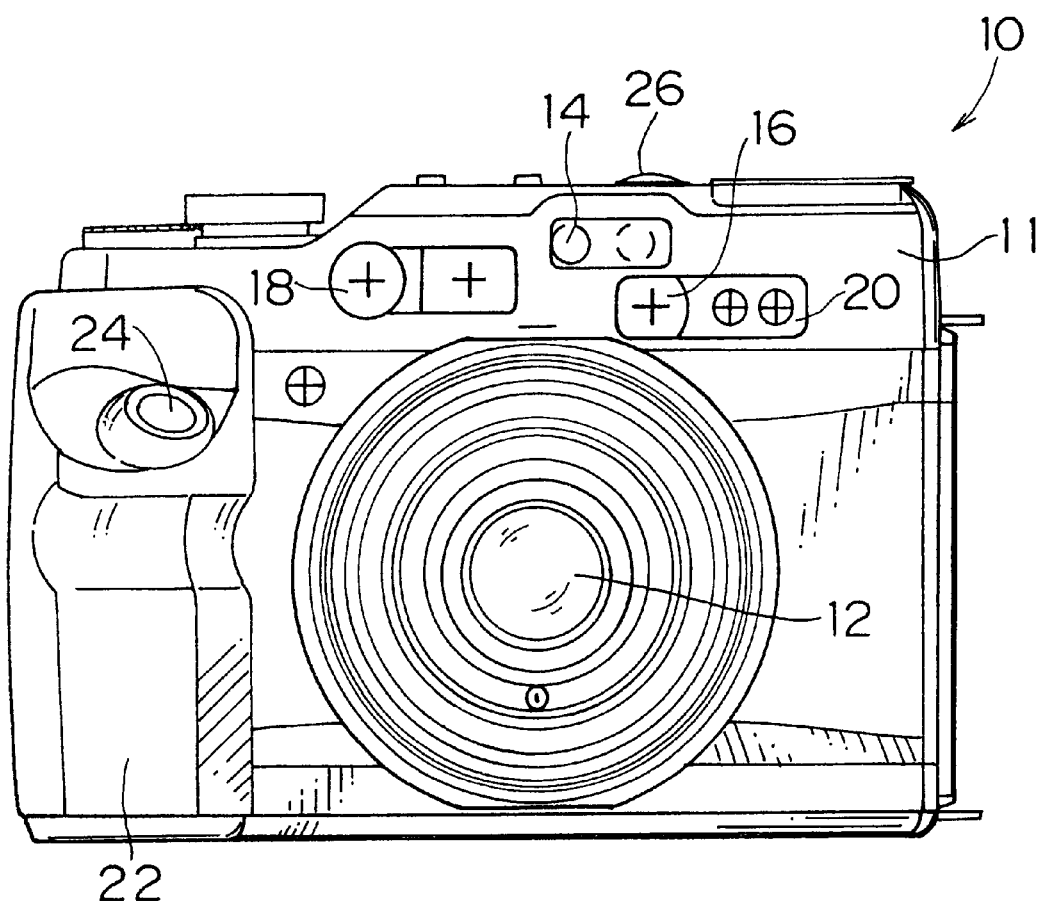

VIEWFINDER

BACKGROUND OF THE INVENTION

1. Field of the Invention

The present invention relates generally to a finder unit, and more particularly to a finder unit that is capable of adjusting diopter and optically displaying information relating to a visual field frame, etc. in the finder.

2. Description of Related Art

The diopter of a camera finder is adjusted by moving a diopter adjustment lens of an eyepiece along the optical axis. For example, as disclosed in Japanese Patent Provisional Publication Nos. 1-155325 and 1-291227, a conventional camera finder unit comprises the diopter adjustment lens that has a follower pin on an edge thereof, a diopter adjustment dial, and a rotary member that is rotated in association with rotation of the diopter adjustment dial. The rotary member has a cam groove on the circumferential surface thereof, and the follower pin engages the cam groove. Rotation of the diopter adjustment dial is transmitted to the rotary member, and the rotation of the rotary member moves the follower pin of the diopter adjustment lens along the cam groove on the rotary member thereby moving the diopter adjustment lens forward and backward along the optical axis.

According to this conventional diopter adjustment mechanism, however, a complicated mechanism is required to convert the rotation of the diopter adjustment dial to the rectilinear movement of the diopter adjustment lens. For this reason, a large space is needed for the finder unit, and the finder unit is difficult to assemble.

In the case of a conventional real-image finder, the finder visual field is restricted by a visual field frame member that is placed on a real-image plane so that the visual field of the finder can substantially correspond to a visual field of the taking lens. In the case of a conventional inverted Galilean finder, a semitransparent mirror is arranged on an optical path between an objective lens and the eyepiece, and an optical image frame representing the visual field frame is arranged on a reflective optical path of the semitransparent mirror. An image of the optical image frame is superimposed on an object image in the visual field due to the transmission and reflection of the semitransparent mirror. The optical image frame is illuminated by outside light taken through a light intake window.

However, the conventional optical image frame is sometimes difficult to see according to the brightness of the object image and the intensity of the outside light taken through the light intake window. Moreover, there is the necessity of changing the finder visual field according to the object distance due to a parallax. In order to change the finder visual field in the case of the real-image finder, the size and position of the visual field frame member must be changed according to the object distance, and therefore, the mechanism is complicated. In the case of the inverted Galilean finder, a double optical image frame is conventionally used so that a visual field frame for a normal shot and a visual field frame for a close shot can always be displayed in the finder visual field. In this case, it is difficult to see the object and determine which visual field frame is appropriate.

SUMMARY OF THE INVENTION

The present invention has been developed in view of the above-described circumstances, and has as its object the provision of a finder unit, which can reduce the size of the diopter adjustment mechanism without deteriorating the optical performance of the finder, and which is simple in structure, easy to assemble, capable of displaying information such as the visual field frame in the finder so that it can be easily seen, and makes it easier to adjust the position of the visual filed frame when the finder unit is assembled.

To achieve the above-mentioned object, the present invention is directed to a finder unit comprising: a diopter adjustment lens moving on an optical axis of the finder unit to adjust diopter of the finder unit and having a follower projection on an edge thereof; a first hollow cylinder enclosing the diopter adjustment lens movably on the optical axis and having a guide groove engaging with the follower projection; and a second hollow cylinder being coaxial with the first hollow cylinder and having a cam face engaging with the follower projection; wherein rotation of the second hollow cylinder relative to the first hollow cylinder moves the follower projection along the guide groove and the cam face such that the diopter adjustment lens moves on the optical axis.

According to the present invention, the second hollow cylinder or a diopter adjustment ring, which moves the diopter adjustment lens, is arranged coaxially with the first hollow cylinder, which supports the diopter adjustment lens movably on the optical axis. This eliminates the necessity for providing a special mechanism that supports the diopter adjustment ring rotatably, and thus, the finder unit is simple in structure and easy to assemble. Moreover, the optical performance is excellent because the pressing member presses the follower pin against the cam face to prevent the looseness of the follower pin. Accordingly, the diopter can be adjusted easily. The second hollow cylinder is preferably provided with a diopter adjustment dial, which is operated manually, formed on an external circumferential surface of the second hollow cylinder.

To achieve the above-mentioned object, the present invention is directed to the finder unit further comprising: an objective lens for forming an object image; an eyepiece; a display for displaying a visual field frame, the display being arranged outside an optical path between the objective lens and the eyepiece; and a semitransparent mirror for superimposing the visual field frame on the object image, the semitransparent mirror being arranged on the optical path.

According to the present invention, the display such as a liquid crystal display (LCD), which is illuminated by a light emitter such as a light-emitting diode (LED), generates the image of the visual field frame. The generated image is superimposed on the object image through the semitransparent mirror, and therefore, the visual field image displayed in the finder can be easily seen regardless of the brightness of the object image and the brightness of the outside light.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front view of a camera to which a finder unit according to an embodiment of the present invention is applied;

DETAILED DESCRIPTION OF THE PREFERRED EMBODIMENT

Figure 2:
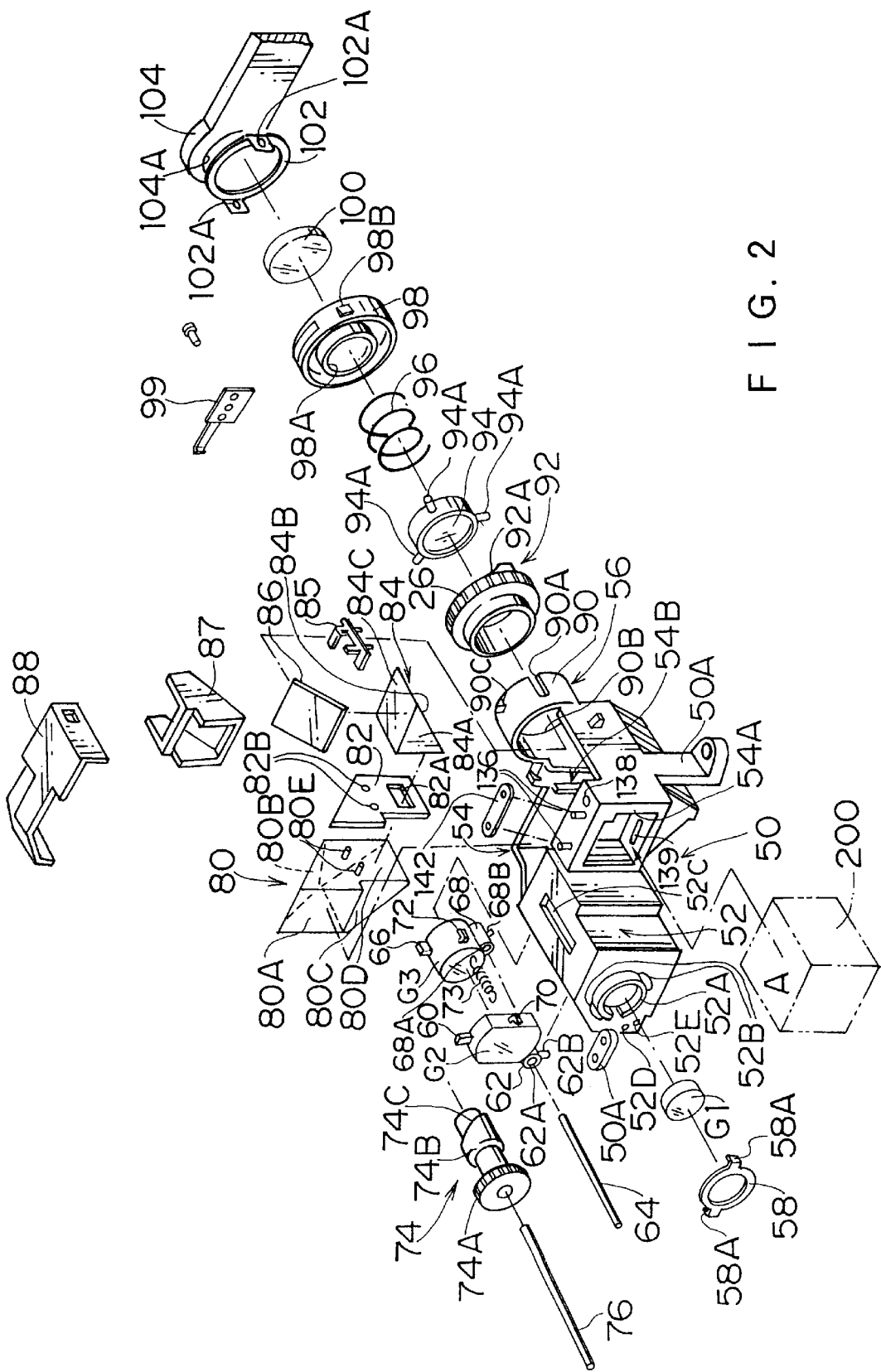
FIG. 2 is an exploded perspective view of the finder unit.

This invention will be described in further detail by way of example with reference to the accompanying drawings.

FIG. 1 is a front view of a camera to which a finder unit according to an embodiment of the present invention is applied. As shown in FIG. 1, a taking lens 12, a finder window 14, an AF light projecting window 16, an AF light receiving window 18, an AE window 20, etc. are provided at the front of the camera 10. A shutter button 24 is provided at a grip part 22, which projects from the front of the camera 10. A diopter adjustment dial 26 and other operational dials and buttons are provided at the top of the camera 10. Rotating the diopter adjustment dial 26 moves a diopter adjustment lens 94 (see FIG. 2) of the finder unit forward and backward, thereby adjusting the diopter of the finder unit (a detailed description will be given later).

FIG. 2 is an exploded perspective view of the finder unit, which is a real-image finder, of the camera 10. As shown in FIG. 2, the finder unit has a finder body 50, and a variety of members of the finder unit are attached to the finder body 50. The finder body 50 is fixed at a predetermined position in the camera via legs 50A with screws.

The finder body 50 consists of a front part 52, a middle part 54 and a rear part 56. An opening 52A is formed on the front face of the front part 52, and an objective lens G1 is fitted in the opening 52A. A fixing ring 58 is attached to the opening 52A over the objective lens G1 in such a way that claws 58A of the fixing ring 58 are fitted into holes 52B formed at the sides of the opening 52A. The fixing ring 58 presses the edge of the objective lens G1 so that the lens G1 can be fixed in the opening 52A. The objective lens G1 is arranged behind the finder window 14 (see FIG. 1) formed in a camera case 11, and the objective lens G1 receives an object light through the finder window 14.

Lenses G2 & G3 are arranged in the front part 52. Projections 60 & 66 are formed at the top edges of the lenses G2 & G3, respectively, and the projections 60 & 66 are slidably fitted into a guide groove 52C formed at the top of the front part 52. Cylindrical guide members 62 & 68 are integrally provided at the bottom edges of the lenses G2 & G3, respectively. A guide shaft 64 is inserted into the front part 52 through a hole 52D formed in the front face of the front part 52, and the guide shaft 64 is inserted into a hole 62A at the center of the guide member 62 and a hole 68A at the center of the guide member 68. The guide shaft 64 is fixed in the front part 52 in parallel to an optical axis of the finder unit with a bearing (not illustrated). Thus, the lenses G2 & G3 are supported in the front part 52 slidably on the optical axis.

A cam member 74 is arranged in the front part 52 in parallel to the guide shaft 64. The cam member 74 is rotatably supported by a shaft 76, which is inserted into the front part 52 through a hole 52E formed in the front face of the front part 52 and is fixed in the front part 52 in parallel to the guide shaft 64. A gear 74A is integrally formed at an end of the cam member 74, and the gear 74A connects with a drive motor (not illustrated) for the taking lens 12 through a gear train (not illustrated). Two cam faces 74B & 74C are formed on the circumferential surface of the cam member 74 in a predetermined positional relationship.

Follower pins 62B & 68B are provided on the guide member 62 of the lens G2 and the guide member 68 of the lens G3, respectively. L-shaped hooks 70 & 72 are provided at the side edges of the lenses G2 & G3, respectively, and a spring 73 is stretched between the hooks 70 & 72. Thus, the lenses G2 & G3 are drawn in such directions as to become closer to one another so that the follower pins 62B & 68B can abut on the cam faces 74B & 74C of the cam member 74, respectively.

When the drive motor runs to move the taking lens 12, the cam member 74 rotates accordingly, and the lenses G2 & G3 move while keeping the positional relationship specified by the cam faces 74B & 74C. Consequently, the visual field of the finder unit can be adjusted appropriately in accordance with the visual field of the taking lens 12.

Figure 3:
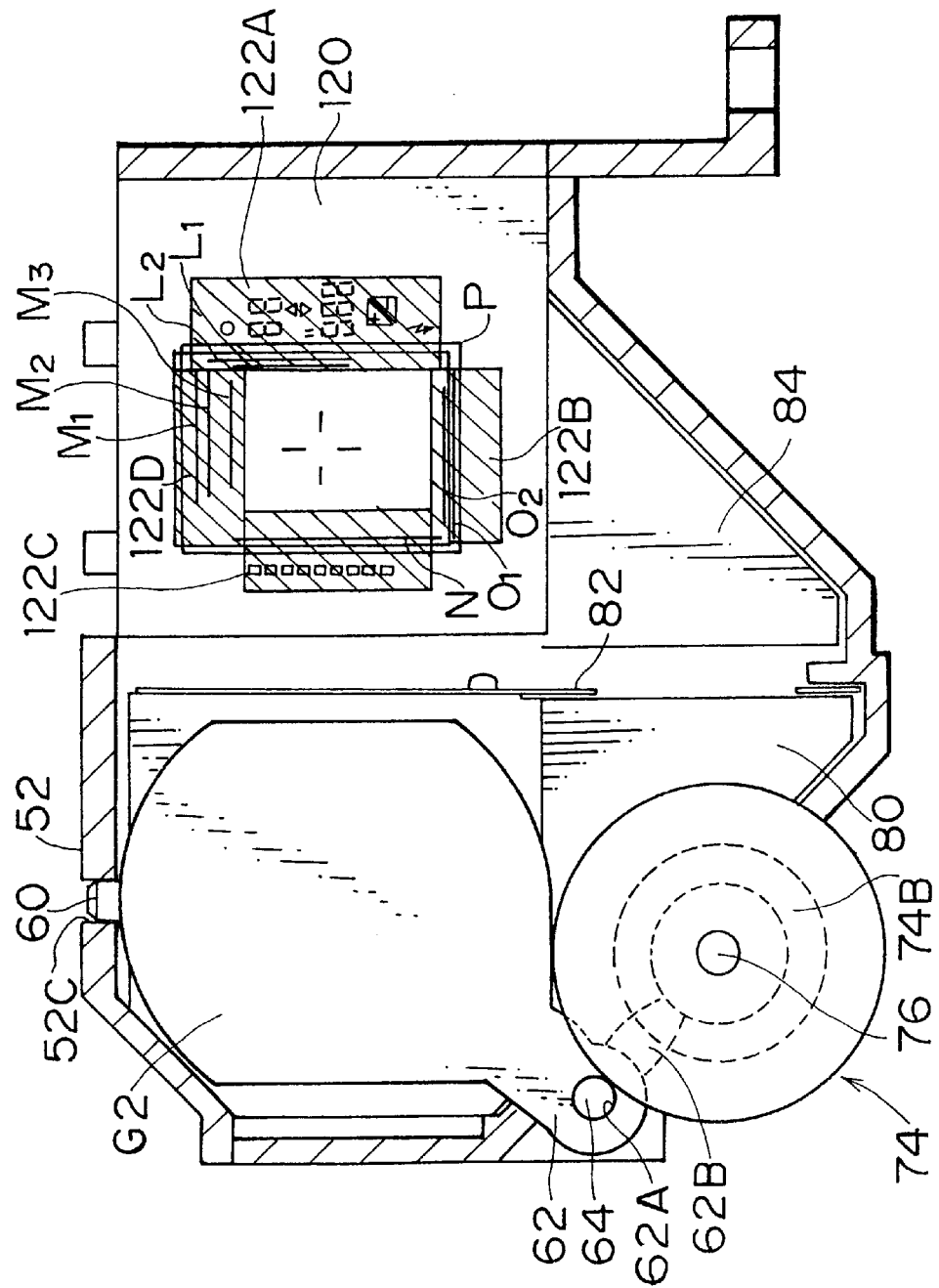
FIG. 3 is a perspective view illustrating the arrangement of members when the finder unit is seen from the front.

FIG. 3 shows the arrangement of the lens G2 and the cam member 74. FIG. 3 is a perspective view of the lens G2 and the cam member 74 when the finder body 50 is seen from the front. As stated previously, the projection 60 formed at the top edge of the lens G2 is fitted into the guide groove 52C formed on the front part 52 of the finder body 50, and the guide shaft 64 is inserted into the hole 62A of the guide member 62 at the bottom edge of the lens G2. The lens G2 is thus supported slidably along the optical axis. The cam member 74 is rotatably supported by the shaft 76 below the lens G2, and the follower pin 62B, which projects from the guide member 62 of the lens G2, abuts on the cam face 74B.

As shown in FIG. 2, a Porro prism 80, a visual field frame member 82, a triangle prism 84, a semitransparent mirror 86, etc. are arranged in the middle part 54 of the finder body 50. The object light enters the Porro prism 80 through an incident plane 80A via the lenses G1, G2 & G3, then reflects on reflective planes 80B & 80C, and exits the prism 80 through an exit plane 80D. The visual field frame member 82 is attached on the exit plane 80D of the Porro prism 80. An opening 82A is formed in the visual field frame member 82, and the opening 82A regulates the visual field of the finder unit. The visual field frame member 82 is positioned on the exit plane 80D in such a way that positioning pins 80E, which project from the exit plane 80D of the Porro prism 80, are inserted into pin holes 82B formed in the visual field frame member 82.

The object light converges through the lenses G1, G2 & G3 to form a real image at the position of the exit plane 80D of the Porro prism 80, in other words, on the plane of the opening 82A of the visual field frame member 82.

The triangle prism 84 is arranged adjacent to the exit plane 80D of the Porro prism 80 across the visual field frame member 82. The triangle prism 84 is fixed in the middle part 54 by a fixing member 85. The object light enters the triangle prism 84 through an incident plane 84A via the visual field frame member 82, then reflects upward on a reflective plane 84B oriented at an angle of 45°, and exits the prism 84 through an exit plane 84C. FIG. 3 shows the arrangement of the Porro prism 80, the visual field frame member 82 and the triangle prism 84.

The semitransparent mirror 86 is arranged above the triangle prism 84, and the semitransparent mirror 86 is fixed in the middle part 54 by a fixing member 87. The semitransparent mirror 86 backwardly reflects the object light, which has upwardly exited the triangle prism 84 through the exit plane 84C. Moreover, the semitransparent mirror 86 transmits light of an optical image representing a variety of information emitted from an LCD part 200 arranged in an opening 54A of the middle part 54 (the LCD part 200 will be described in detail later). Consequently, the optical image is superimposed on the object image, and thus an image composed from the optical image and the object image is transmitted to the rear part 56 of the finder body 50.

After the above-mentioned members are placed inside of the middle part 54, the opening 54B is covered with a dust prevention cover 88 to prevent the dust from getting into the finder body 50.

Figure 4:
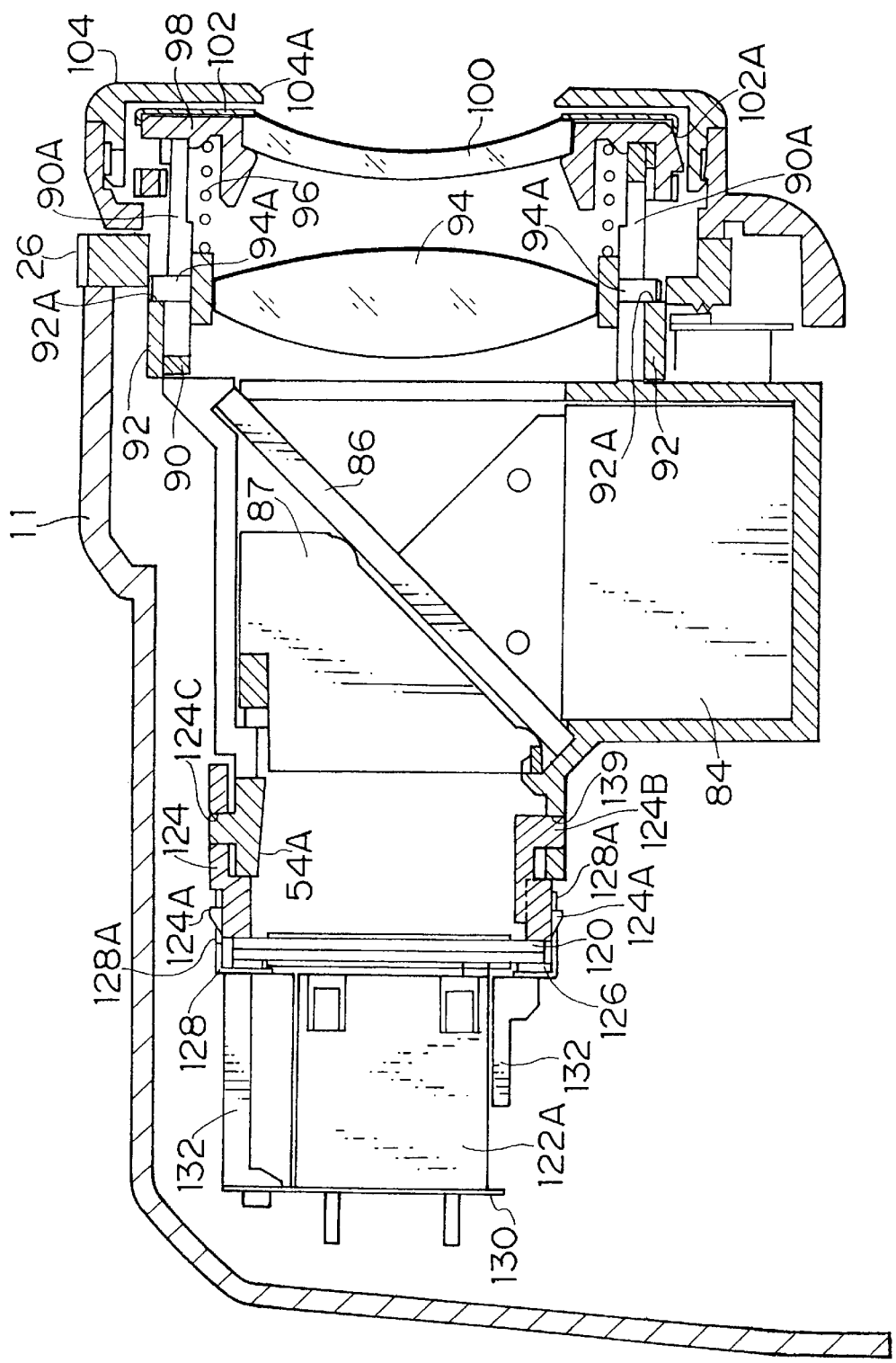
FIG. 4 is a side sectional view of the finder unit.

The rear part 56 of the finder body 50 includes a first hollow cylinder 90, where a second hollow cylinder or a diopter adjustment ring 92, a diopter adjustment lens 94, a pressing member or a spring 96, a dust prevention lens frame 98, etc. are arranged. FIG. 4 is a sectional view in which the finder body 50 fixed to the case 11 of the camera 10 is cut with a vertical plane that goes through the center of the rear part 56. A description will be given of the structure of the rear part 56 with reference to FIGS. 2 and 4.

The diopter adjustment ring 92 is integrated with the diopter adjustment dial 26 (see FIGS. 1 and 4), which is arranged at the top of the camera case 11. The diopter adjustment ring 92 is fitted on the cylinder 90 in such a way that the diopter adjustment ring 92 can rotate freely. Rotating the diopter adjustment dial 26 from the outside of the camera 10 causes the diopter adjustment ring 92 to rotate. A cam face 92A is formed at the rear end of the diopter adjustment ring 92, with which follower projections or pins 94A of the diopter adjustment lens 94 come into contact.

The diopter adjustment lens 94 is inserted into the cylinder 90 from behind, and it is slidably supported on the inner surface of the cylinder 90. Three follower pins 94A are provided on the edge of the diopter adjustment lens 94, and they are fitted in straight guide grooves 90A, which are formed through the cylinder 90 along the optical axis. The diopter adjustment lens 94 is capable of moving only along the optical axis while the rotation thereof is prevented. The ends of the follower pins 94A abut on the cam face 92A of the diopter adjustment ring 92 through the straight grooves 90A.

The spring 96 is arranged behind the diopter adjustment lens 94, and the dust prevention lens frame 98 is arranged behind the spring 96. The dust prevention lens frame 98 is fixed in an opening 90B, which is formed at the rear part of the cylinder 90, with a claw 90C, and the rear end of the spring 96 is fixed by the dust prevention lens frame 98. The front end of the spring 96 presses the edge of the diopter adjustment lens 94. The diopter adjustment lens 94 is thereby pressed forward so that the follower pins 94A are pressed against the cam face 92A of the diopter adjustment ring 92. Rotating the diopter adjustment dial 26 from the outside of the camera 10 and rotating the diopter adjustment ring 92 cause the diopter adjustment lens 94 to move along the optical axis in association with the cam face 92A. Consequently, the position of the diopter adjustment lens 94 can be adjusted to achieve proper finder diopter.

The spring 96 presses the follower pins 94A against the cam face 92A, and presses the diopter adjustment ring 92 against a side wall of the middle part 54, thereby preventing the looseness of the diopter adjustment lens 94.

In order to add a click feeling to the rotation of the diopter adjustment dial 26, click grooves are formed around the diopter adjustment ring 92, and a click leaf spring 99 engages with the click grooves.

A fixing ring 102 fixes an eyepiece or a dust prevention lens 100 in an opening 98A of the dust prevention lens frame 98. The fixing ring 102 is fixed on the dust prevention lens frame 98 in such a way that claws 98B formed on the edge of the dust prevention lens frame 98 are fitted in holes 102A of projecting pieces formed at the edge of the fixing ring 102. Thus, the dust prevention lens 100 prevents the dust from getting into the finder body 50.

The object image is formed at the opening 82A of the visual field frame member 82, and it is reflected on the triangle prism 84 and the semitransparent mirror 86 toward the rear part 56. Then, the object image is enlarged through the diopter adjustment lens 94 and the dust prevention lens 100, and goes through an opening 104A of a finder cover 104, so that a cameraman can view the image.

According to the diopter adjustment mechanism which is constructed in the above-mentioned manner, the mechanism can be compact, since the diopter adjustment ring 92, the diopter adjustment lens 94, etc. are arranged on the outside and the inside of the cylinder 90. The diopter adjustment ring 92, the diopter adjustment lens 94, the spring 96 and the dust prevention lens frame 98 are sequentially fitted onto or into the cylinder 90, and thus, the structure is extremely simple and easy to assemble. In addition, since the looseness of the diopter adjustment lens 94 is prevented, the optical performance of the finder unit is excellent.

Figure 5:
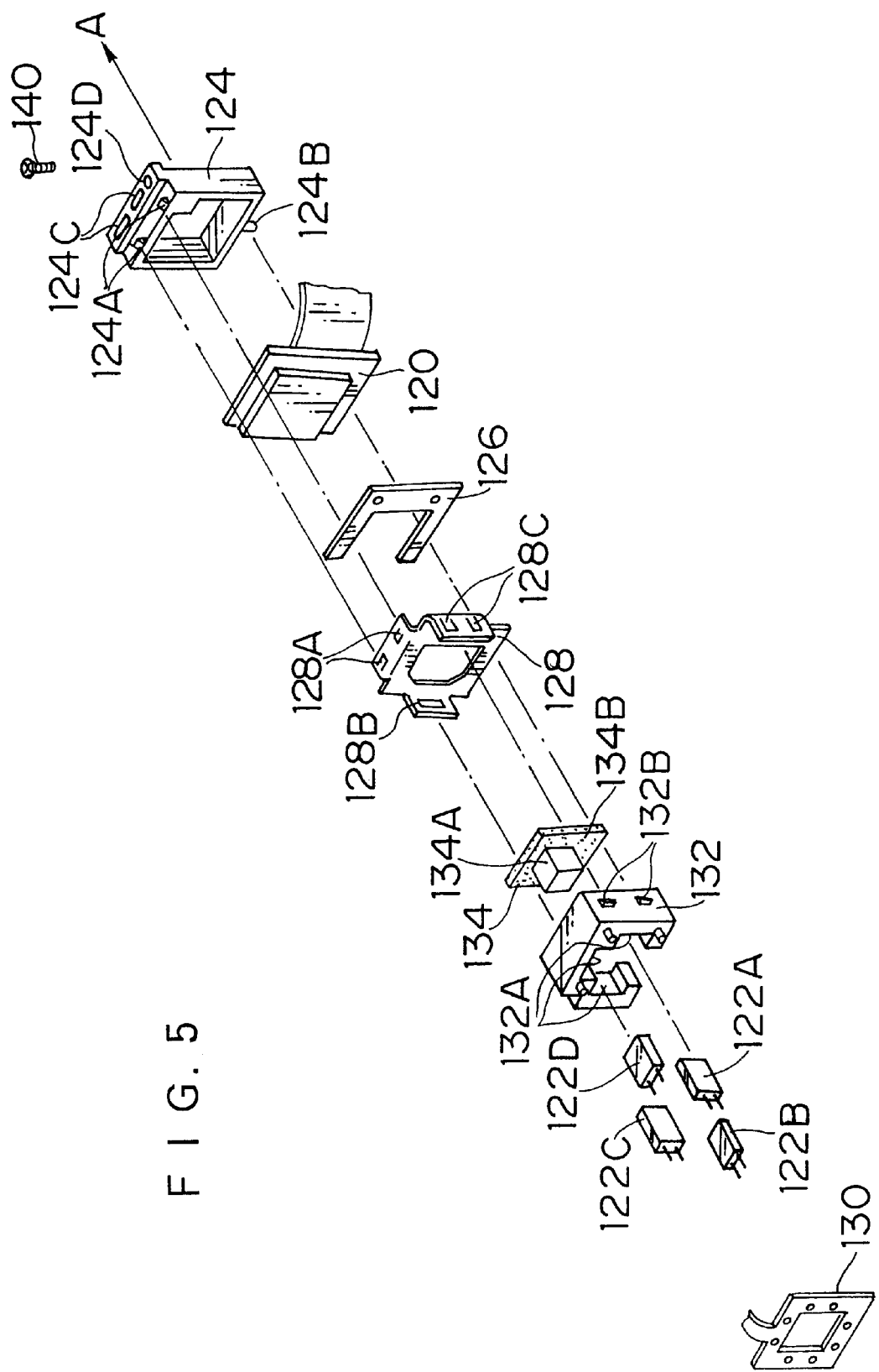
FIG. 5 is an exploded perspective view of an LCD part.

A description will be given of the structure of the LCD part 200 mounted in the opening 54A formed in the middle part 54 of the finder body 50 with reference to FIG. 4 and the exploded perspective view of FIG. 5. The LCD part 200 comprises an LCD panel 120, which displays the optical image representing a variety of information on a display screen, and four LEDs 122A, 122B, 122C & 122D, which illuminate the LCD panel 120 from the backside. The front surface of the LCD panel 120 abuts on an LCD frame 124, and a fixing member 128 is attached to the back surface of the LCD panel 120 through a spacer 126, which makes up for a difference. The fixing member 128 is fixed in the LCD frame 124 in such a way that claws 124A formed at the top and bottom of the LCD frame 124 are fitted in holes 128A of projecting pieces formed at the top and bottom ends of the fixing member 128. Thus, the LCD panel 120 is fixed on the LCD frame 124 with the fixing member 128.

When the LCD panel 120 is fixed in the LCD frame 124, the angle of the LCD panel 120 is adjusted so that the direction of the panel 120 can correspond to that of the LCD frame 124.

On the other hand, the LEDs 122A–122D are mounted on a circuit board 130, and the electric power is supplied to the LEDs 122A–122D from the circuit board 130 so that the light emitting planes of the LEDs 122A–122D can emit light. The LEDs 122A–122D are fitted in depressions 132A formed inside a light guide frame 132, and a light guide 134 is attached to the front surface of the light guide frame 132. A central projecting part 134A of the light guide 134 is a light shielding member, which is inserted into a hole formed by the four LEDs 122 fixed inside the light guide frame 132. Consequently, the light does not enter the central area enclosed by the four LEDs 122A–122D.

A flat part 134B at the rim of the light guide 134 is arranged over the light emitting planes of the LEDs 122A–122D. The flat part 134B diffuses the light emitted from the LEDs 122A–122D and uniformly transmits the light forward.

After the LEDs 122A–122D and the light guide 134 are mounted in the light guide frame 132, the light guide frame 132 is attached to the backside of the fixing member 128. Specifically, claws 132B are formed at one side of the light guide frame 132, and a projection (not illustrated) is formed at the reverse side. The projection is fitted into a hole 128B formed in the fixing member 128, and the claws 132B are hooked in holes 128C formed in the fixing member 128 so that the light guide frame 132 can be fixed on the fixing member 128. Consequently, the light guide frame 132 connects with the LCD frame 124, and an illumination light source of the LEDs 122A–122D is arranged at the backside of the LCD panel 120.

The LCD part 200, which is constructed in the above-mentioned manner, connects with the opening 54A formed in the middle part 54 of the finder body 50 in FIG. 2. Two pins 136 project from the top of the opening 54A of the middle part 54, and a screw hole 138 is also formed at the top of the opening 54A. A slot 139 is formed at the bottom of the opening 54A. On the other hand, as shown in FIG. 5, slots 124C and a hole 124D are formed in a projecting piece at the top of the LCD frame 124, and a screw 140 is inserted into the hole 124D. A pin 124B projects from the bottom of the LCD frame 124. The diameter of the hole 124D is larger than that of the screw 140.

As shown in FIG. 4, the pins 136 of the opening 54A are inserted into the slots 124C of the LCD frame 124, and the pin 124B of the LCD frame 124 is inserted into the slot 139 of the opening 54A. The screw 140 is tightened to the screw hole 148 of the opening 54A through the hole 124D of the LCD frame 124, so that the LCD frame 124 can be fixed in the opening 54A.

When the LCD frame 124 is fixed in the opening 54A, the LCD frame 124 is slidable within a range regulated by the slots 124C and the slot 139, so that the horizontal position of the display screen of the LCD panel 120 can be adjusted easily. The vertical position of the display screen can be adjusted by inserting an adjustment washer 142 with an appropriate thickness between the finder body 50 and the LCD frame 124.

Figure 6:
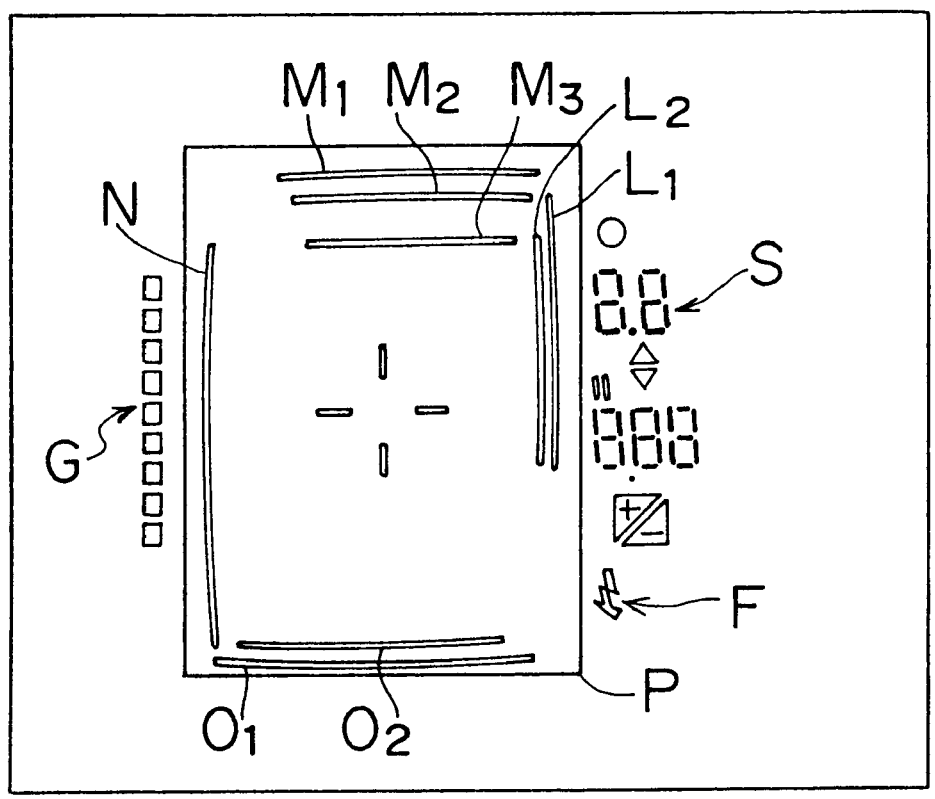
FIG. 6 is a view illustrating the structure of an optical image shown on the finder.

A description will be given of what is displayed on the LCD panel 120 of the LCD part 200 and the areas illuminated by the LEDs 122A–122D with reference to FIGS. 3 and 6. These drawings illustrate the edge of the opening 82A of the visual field frame member 82, which is placed on the real-image plane, as a frame P on the LCD panel 120. The frame P is not displayed on the LCD panel 120, but it indicates a positional relationship between the display screen of the LCD panel 120 and the edge of the opening 82A. Lines $L_1$, $L_2$, $M_1$, $M_2$, $M_3$, N, $O_1$ & $O_2$ indicating the visual field frames according to the object distance are displayed within the frame P as shown in FIGS. 3 and 6. For example, the object distance is divided into three levels. The lines $L_1$, $M_1$, N & $O_1$ are displayed in the case of a long shot; the lines $L_1$, $M_2$, N & $O_1$ are displayed in the case of a middle shot; and the lines $L_2$, $M_3$, N & $O_2$ are displayed in the case of a close shot. Thus, the visual field frame is appropriately displayed in the finder according to the object distance.

The object distance is indicated in an indicator G at the left side of the frame P of the LCD panel 120. A shutter speed S, strobe information F, etc. are indicated at the right side of the frame P.

As shown in FIG. 3, the LEDs 122A–122D are arranged within areas indicated by slanted lines on the LCD panel 120. The LEDs 122A–122D, which are arranged at the reverse side of the LCD panel 120, illuminate these areas with the light. Thus, for example, the LED 122A and the LED 122C, which illuminate the information displayed outside the frame P, are also used to illuminate the lines that indicate the visual field frames inside the frame P. This reduces the number of LEDs.

According to the LCD part 200 constructed in the above-mentioned manner, the visual field frames are shown on the LCD panel 120 illuminated by the LEDs 122A–122D, and thus, the visual field frames can be easily seen without the effects of the brightness of the object image, etc. Only changing the positions of the visual field frames displayed on the LCD panel 120 makes it possible to easily change the visual field frames according to the object distance. Moreover, there is no necessity of always displaying a plurality of visual field frames for the close shot and the long shot for example. Therefore, the object image in the finder can be easily seen, and the visual field frame can be recognized correctly.

In this embodiment, the real-image finder is used, but the present invention may also be applied to another finder such as an inverted Galilean finder.

According to the finder unit of the present invention, the diopter adjustment ring, which moves the diopter adjustment lens forward and backward with the cam mechanism, is arranged coaxial with the cylinder supporting the diopter adjustment lens, and this eliminates the necessity for providing a special mechanism that supports the diopter adjustment ring rotatably. Therefore, the finder unit is simple in structure and compact. The cam mechanism is not a combination of the follower pin and the cam groove, but a combination of the follower pin and the cam face. For this reason, the finder unit can be easily assembled by arranging the diopter adjustment ring, the diopter adjustment lens and the pressing member in the guide member in a predetermined order. Moreover, the optical performance is excellent without the looseness, since the pressing member presses the follower pin against the cam face. Accordingly, the diopter can be adjusted easily.

The LCD panel, which is illuminated by the light emitter such as the LED, generates the image of the visual field frame, and the generated image is superimposed on the object image through the semitransparent mirror. For this reason, the visual field frame in the finder can be easily seen regardless of the brightness of the object image and the brightness of the external light.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A viewfinder comprising:

a diopter adjustment lens moving on an optical axis of the viewfinder to adjust diopter of the viewfinder and having a follower projection on an edge thereof;

a first hollow cylinder enclosing the diopter adjustment lens movably on the optical axis and having a guide groove engaging with the follower projection;

a second hollow cylinder being coaxial with the first hollow cylinder and having a cam face engaging with the follower projection, the cam face being formed on an end face of the second hollow cylinder, the second hollow cylinder including a diopter adjustment dial to be operated manually, the diopter adjustment dial being formed on an external circumferential surface of the second hollow cylinder such that a portion of the diopter adjustment dial is exposed to the external appearance of the viewfinder, and the exposed portion of the diopter adjustment dial can be directly and manually operated by a user;

a pressing member for pressing the follower projection against the cam face;

a viewfinder body including the first hollow cylinder operatively connected thereto;

an objective lens operatively connected to the viewfinder body for forming an object image;

a display operatively connected to the viewfinder body for displaying a visual field frame, the display being arranged outside an optical path between the objective lens and the diopter adjustment lens; and a semitransparent mirror for superimposing the visual field frame on the object image, the semitransparent mirror being arranged on the optical path, wherein rotation of the second hollow cylinder relative to the first hollow cylinder moves the follower projection along the guide groove and the cam face such that the diopter adjustment lens moves on the optical axis.

2. The viewfinder as defined in claim 1, wherein the display includes a plurality of visual field frame display positions which are selectively displayed according to an object distance.

3. The viewfinder as defined in claim 1, wherein a variety of information is displayed on the display.

4. The viewfinder as defined in claim 1, wherein the display is a liquid crystal display.

5. The viewfinder as defined in claim 1, further comprising a light emitter for illuminating the display.

6. The viewfinder as defined in claim 5, wherein the light emitter is a light-emitting diode.

7. A viewfinder comprising:

a diopter adjustment lens moving on an optical axis of the viewfinder to adjust diopter of the viewfinder and having a follower projection on an edge thereof;

a first hollow cylinder enclosing the diopter adjustment lens movably on the optical axis and having a guide groove engaging with the follower projection;

a second hollow cylinder being coaxial with the first hollow cylinder and having a cam face engaging with the follower projection;

an eyepiece comprising a dust prevention lens;

a dust prevention lens frame supporting the dust prevention lens; and a pressing member arranged between the diopter adjustment lens and the dust prevention lens frame, wherein rotation of the second hollow cylinder relative to the first hollow cylinder moves the follower projection along the guide groove and the cam face such that the diopter adjustment lens moves on the optical axis.

8. The viewfinder as defined in claim 7, wherein the pressing member comprises a spring.

9. The viewfinder as defined in claim 7, wherein the second hollow cylinder is provided with a diopter adjustment dial to be operated manually, the diopter adjustment dial being formed on an external circumferential surface of the second hollow cylinder.

10. The viewfinder as defined in claim 7, further comprising:

a viewfinder body including the first hollow cylinder operatively connected thereto;

an objective lens operatively connected to the viewfinder body for forming an object image;

a display operatively connected to the viewfinder body for displaying a visual field frame, the display being arranged outside an optical path between the objective lens and the eyepiece; and a semitransparent mirror for superimposing the visual field frame on the object image, the semitransparent mirror being arranged on the optical path.

11. The viewfinder as defined in claim 10, wherein the display includes a plurality of visual field frame display positions which are selectively displayed according to an object distance.

12. The viewfinder as defined in claim 10, wherein a variety of information is displayed on the display.

13. The viewfinder as defined in claim 10, wherein the display is a liquid crystal display.

14. The viewfinder as defined in claim 10, further comprising a light emitter for illuminating the display.

15. The viewfinder as defined in claim 14, wherein the light emitter is a light-emitting diode.

16. The viewfinder as defined in claim 7, wherein the cam face is formed on an end face of the second hollow cylinder.

* * * * *